United States Patent
Kataja (10) Patent No.: US 11,971,628 B1
(45) Date of Patent: Apr. 30, 2024

(54) COMPENSATION OF CHROMATIC ABERRATION IN LIQUID CRYSTAL ELEMENTS

(71) Applicant: Pixieray Oy, Espoo (FI)

(72) Inventor: Mikko Kataja, Helsinki (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 18/460,895

(22) Filed: Sep. 5, 2023

(51) Int. Cl.
   *G02F 1/13363* (2006.01)
   *G02F 1/1333* (2006.01)

(52) U.S. Cl.
   CPC .. *G02F 1/133637* (2021.01); *G02F 1/133368* (2021.01)

(58) Field of Classification Search
   None
   See application file for complete search history.

(56) References Cited

U.S. PATENT DOCUMENTS

2020/0110324 A1* 4/2020 Wang .................... G02F 1/1347

* cited by examiner

*Primary Examiner* — Phu Vu
(74) *Attorney, Agent, or Firm* — Ziegler IP Law Group (57) ABSTRACT

In an optical apparatus, a processor(s) is configured to: generate a primary drive signal to drive a primary LC element including a primary active material to produce a first primary optical power for a first design wavelength, wherein there is also produced a second primary OP for a second design wavelength; and generate a secondary drive signal to drive a secondary LC element(s) with a secondary active material to produce a first secondary OP for the first design wavelength and a second secondary OP for the second design wavelength, based on said primary OPs, and different dispersion properties of secondary active material and primary active material. The first and second secondary OPs compensate for chromatic aberration produced by the primary LC element on polychromatic light for the first design wavelength and the second design wavelength.

18 Claims, 3 Drawing Sheets

COMPENSATION OF CHROMATIC ABERRATION IN LIQUID CRYSTAL ELEMENTS

TECHNICAL FIELD

The present disclosure relates to optical apparatuses incorporating compensation of chromatic aberration in liquid crystal elements.

Moreover, the present disclosure relates to imaging systems comprising such optical apparatuses. Furthermore, the present disclosure relates to methods incorporating compensation of chromatic aberration in liquid crystal elements.

BACKGROUND

"Polychromatic light" is light of multiple colours (namely, multiple wavelengths), and it can be produced using various sources, including natural sources (such as the sun) or artificial sources (such as light-emitting diodes or incandescent light bulbs). When the polychromatic light passes through optical elements such as lenses, undesirable chromatic aberration is observed due to a phenomenon known as dispersion. Moreover, the chromatic aberration is observed irrespective of the type of the lenses used.

Figure 1:
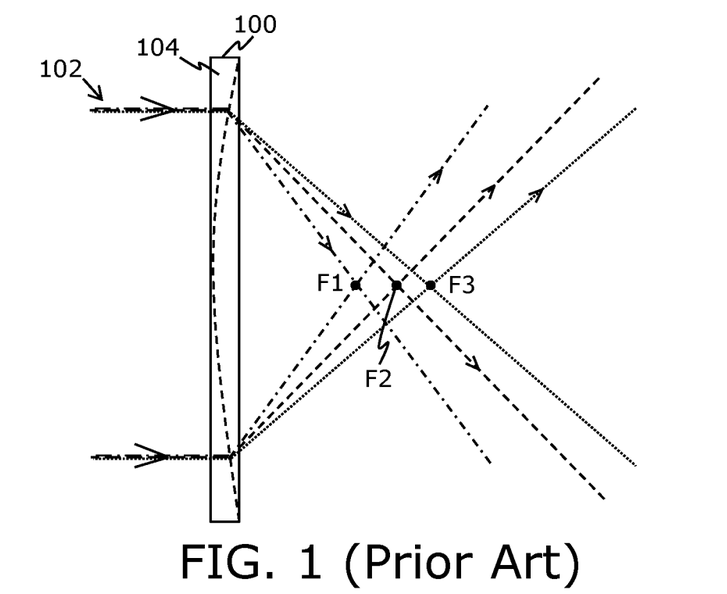
FIG. 1 (Prior Art) is a ray diagram illustrating how a liquid crystal element affects polychromatic light passing therethrough.

FIG. 1 (depicting Prior Art) is a ray diagram illustrating how a liquid crystal element affects polychromatic light passing therethrough. Referring to FIG. 1 (Prior Art), the ray diagram illustrates how a liquid crystal element 100 affects polychromatic light 102 passing therethrough. A refractive index of an active material 104 of the liquid crystal element 100 varies with a wavelength of light passing therethrough, due to a phenomenon known as dispersion. Therefore, when the polychromatic light 102 passes through the liquid crystal element 100, its constituent light having different wavelengths is focused at different focal planes (i.e., at different focus points lying on planes that are at different distances from the liquid crystal element 100). For example, blue light having a wavelength of approximately 480 nanometres (nm) is focused to a focus point F1, green light having a wavelength of approximately 550 nm is focused to a focus point F2, and red light having a wavelength of approximately 630 nm is focused to a focus point F3. This means that the liquid crystal element 100 produces chromatic aberration on the polychromatic light 102.

Therefore, it is not possible to design a single lens to focus various wavelengths at a same focal plane. Typically, a lens is designed to focus light in a particular wavelength, commonly referred as a design wavelength of the lens, at a particular focal plane. As a result, lights of non-design wavelengths are focused at different focal planes (i.e., such lights have focal lengths that are different from a focal length of the light in the design wavelength). When such a lens is implemented as a camera lens, polychromatic light emanating from a real-world scene undergoes chromatic aberration upon passing through the lens, thereby forming a multi-colour image at an image sensor that is quite blurry.

In conventional lenses, the problem of chromatic aberration is addressed by using achromatic pairs, achromatic triplets, or even higher order combinations of lenses that collectively compensate for refractive index variation for light in multiple design wavelengths. The same problem of chromatic aberration is also prevalent in liquid crystal lenses, but its correction has not yet been addressed. Moreover, as an additional problem, temperature also strongly influences dispersion of liquid crystals; so, an extent of chromatic aberration produced by the liquid crystal lenses also varies with temperature.

Therefore, in light of the foregoing discussion, there exists a need to overcome the aforementioned drawbacks.

SUMMARY

The aim of the present disclosure is to provide an optical apparatus, an imaging system, and a method that is capable of effectively correcting chromatic aberration produced in polychromatic light upon its passage through a primary liquid crystal element using a simple, easy to implement solution. The aim of the present disclosure is achieved by an optical apparatus, an imaging system comprising the optical apparatus, and a method which incorporate compensation for chromatic aberration in liquid crystal elements, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an optical apparatus comprising:

a primary liquid crystal element;

at least one secondary liquid crystal element arranged on an optical path of polychromatic light exiting the primary liquid crystal element, the at least one secondary liquid crystal element comprising a secondary active material whose dispersion properties are different from dispersion properties of a primary active material of the primary liquid crystal element; and at least one processor configured to:

generate a primary drive signal to drive the primary liquid crystal element to produce a first primary optical power for a first design wavelength, wherein the primary liquid crystal element, when driven, also produces at least a second primary optical power for a second design wavelength; and generate a secondary drive signal to drive the at least one secondary liquid crystal element to produce a first secondary optical power for the first design wavelength and at least a second secondary optical power for the second design wavelength, based on the first primary optical power, the second primary optical power, the dispersion properties of the secondary active material and the dispersion properties of the primary active material;

wherein when produced at the at least one secondary liquid crystal element, the first secondary optical power and the second secondary optical power compensate for chromatic aberration produced by the primary liquid crystal element on the polychromatic light for the first design wavelength and the second design wavelength.

In a second aspect, the present disclosure provides an imaging system comprising an optical apparatus of the first aspect, and an image sensor, wherein upon compensating the chromatic aberration, the at least one secondary liquid crystal element focuses light of the first design wavelength and the second design wavelength in the polychromatic light, at the image sensor.

In a third aspect, the present disclosure provides a method comprising:

generating a primary drive signal to drive a primary liquid crystal element to produce a first primary optical power for a first design wavelength, wherein the primary liquid crystal element, when driven, also produces at least a second primary optical power for a second design wavelength; and generating a secondary drive signal to drive at least one secondary liquid crystal element to produce a first secondary optical power for the first design wavelength and at least a second secondary optical power for the second design wavelength, based on the first primary optical power, the second primary optical power, dispersion properties of a secondary active material of the at least one secondary liquid crystal element and dispersion properties of a primary active material of the primary liquid crystal element, wherein the at least one secondary liquid crystal element is arranged on an optical path of polychromatic light exiting the primary liquid crystal element, and the dispersion properties of the secondary active material are different from the dispersion properties of the primary active material;

wherein when produced at the at least one secondary liquid crystal element, the first secondary optical power and the second secondary optical power compensate for chromatic aberration produced by the primary liquid crystal element on the polychromatic light for the first design wavelength and the second design wavelength.

The present disclosure provides the aforementioned optical apparatus, the aforementioned imaging system, and the aforementioned method for effectively compensating chromatic aberration inherently produced by liquid crystal elements on polychromatic light. The primary liquid crystal element inherently produces the chromatic aberration on the polychromatic light, while the at least one secondary liquid crystal element is utilized for correcting said chromatic aberration. The secondary active material (of the at least one secondary liquid crystal element) is purposely selected to have dispersion properties that are different from those of the primary active material (of the primary liquid crystal element), so that the secondary active material produces a compensatory dispersive effect on the polychromatic light passing therethrough. This compensatory dispersive effect cancels out a dispersive effect produced by the primary active material (that introduced said chromatic aberration) on the polychromatic light. Moreover, producing the first secondary optical power and the second secondary optical power, based on the first and second primary optical powers and the different dispersion properties of the primary and secondary active materials, enables in accurately adjusting an amount of the compensatory dispersive effect on the light for two different design wavelengths, so that the polychromatic light which passes through at least one secondary liquid crystal element is free or almost-free from chromatic aberration for these two design wavelengths. In simple terms, the different dispersion properties of the secondary active material (as compared to the dispersion properties of the primary active material) along with the first and second secondary optical powers (that are determined based on the first and second primary optical powers and the dispersion properties) produces a synergistic effect of effectively compensating for the chromatic aberration produced on the polychromatic light by the primary liquid crystal element, for the first and second design wavelengths. Effectively, chromatic aberration may be reduced throughout a wavelength range including the first design wavelength and the second design wavelength by such a compensatory effect. The optical apparatus described herein is easy to implement, cost-efficient, and has a simple optical configuration. The imaging system is capable to capture sharp multispectral images (for example, multi-colour images in case of the polychromatic light comprising visible light). The method described herein is simple and easy to implement.

Throughout the present disclosure, the term "optical apparatus" refers to an apparatus that employs liquid crystal elements through which polychromatic light passes in operation. Examples of the optical apparatus include, but are not limited to, a pair of glasses, a pair of sunglasses, smart glasses, a head-mounted display, camera optics, microscope optics, and medical imaging device optics. Optionally, the polychromatic light comprises at least one of: visible light, infrared light, microwave radiation, ultraviolet light, X-rays.

The "primary liquid crystal element" is a liquid crystal element that is controllable to focus the polychromatic light passing therethrough. The primary liquid crystal element is an active liquid crystal element. It can be actively driven using different primary drive signals to produce different first primary optical powers for the first design wavelength, as and when required. These different first primary optical powers correspondingly have different focal lengths for the first design wavelength.

In a given liquid crystal element, a given drive signal controls a refractive index of a given active material.

Throughout the present disclosure, the "given liquid crystal element" refers to the primary liquid crystal element and/or the at least one secondary liquid crystal element, the "given drive signal" refers to the primary drive signal and/or the secondary drive signal, and the "given active material" refers to the primary active material and/or the secondary active material, respectively.

Moreover, a given "design wavelength" of the given liquid crystal element is a wavelength for which the given liquid crystal element is designed to operate. It will be appreciated that light of other wavelengths that are different from the given design wavelength can also pass through and be manipulated by the given liquid crystal element, however, the functioning of the given liquid crystal element is optimized for the given design wavelength. The given design wavelength is selected based on an intended application of a liquid crystal element and specific properties of active material of the liquid crystal element. Throughout the present disclosure, the "given design wavelength" refers to the first design wavelength (of the first liquid crystal element) and/or the second design wavelength (of the second liquid crystal element).

The "active material" is a material that is controllable to produce at least a particular optical power for a particular design wavelength. The given active material comprises at least one liquid crystal compound. Additionally, optionally, the given active material comprises at least one additive. The at least one additive could be at least one dopant e.g. a chiral dopant, at least one stabilizer, or the like, and may affect optical characteristics of the given active material.

Optionally, the primary liquid crystal element further comprises:
- at least a first substrate and a second substrate that are optically transparent, wherein the primary active material is encased between the first substrate and the second substrate;
- at least one first electrode deposited on the first substrate and disposed between the first substrate and the primary active material; and
- at least one second electrode deposited on the second substrate and disposed between the second substrate and the primary active material, wherein the at least one first electrode and the at least one second electrode are optically transparent.

The "secondary liquid crystal element" is a liquid crystal element that is controllable to compensate for the chromatic aberration produced by the primary liquid crystal element on the polychromatic light. The polychromatic light, upon which the chromatic aberration has been produced by the primary liquid crystal element, passes through the at least one secondary liquid crystal element that is arranged on its optical path. The at least one secondary liquid crystal element comprises an active liquid crystal element. It can also be actively driven using different secondary drive signals to produce different first secondary optical powers for the first design wavelength and different second secondary optical powers for the second design wavelength, as and when required.

In some implementations, the optical apparatus comprises a single secondary liquid crystal element. In other implementations, the optical apparatus comprises a plurality of secondary liquid crystal elements. It will be appreciated that a number of design wavelengths that can be focused on a same focal point (i.e., a number of design wavelengths for which the chromatic aberration can be fully and accurately corrected) depends on a number of secondary liquid crystal element(s) used in the optical apparatus. For example, when the optical apparatus comprises one secondary liquid crystal element, two design wavelengths can be focused on the same focal point; when the optical apparatus comprises two secondary liquid crystal elements, three design wavelengths can be focused on the same focal point; and so on. Moreover, using the plurality of secondary liquid crystal elements also requires using a plurality of secondary active materials whose dispersion properties are different from each other and also different from the primary active material. The at least one secondary liquid crystal element, in operation, is capable of dynamically correcting the chromatic aberration produced by the primary liquid crystal element, for various different primary optical powers produced by the primary liquid crystal element during use.

It will be appreciated that when the plurality of secondary liquid crystal elements are employed in the optical apparatus (for example, in a stacked manner to form a stacked compensatory arrangement), there could be produced at least one third primary optical power for at least one third design wavelength in the primary liquid crystal element; however, the present disclosure refers to only a single second primary optical power and a single second design wavelength, for the sake of simplicity.

Optionally, the at least one secondary liquid crystal element further comprises:
- at least a third substrate and a fourth substrate that are optically transparent, wherein the secondary active material is encased between the third substrate and the fourth substrate;
- at least one third electrode deposited on the third substrate and disposed between the third substrate and the secondary active material; and
- at least one fourth electrode deposited on the fourth substrate and disposed between the fourth substrate and the secondary active material, wherein the at least one third electrode and the at least one fourth electrode are optically transparent.

A given substrate can be made of any one of: glass, a polycarbonate, a plastic, a high-index plastic. The given substrate is at least one of: the first substrate, the second substrate, the third substrate, the fourth substrate. A given electrode may be deposited as a transparent electrode layer on its corresponding substrate, wherein said transparent electrode layer can be continuous or may be in the form of separate, unconnected segments. The transparent electrode layer may, for example, be made of indium tin oxide (ITO), doped zinc oxide (ZnO) (where ZnO is doped with aluminium or hydrogen), a conductive polymer, or graphene. The given electrode is at least one of: the at least one first electrode, the at least one second electrode, the at least one third electrode, the at least one fourth electrode. Optionally, the primary liquid crystal element is implemented as a liquid crystal lens. Similarly, optionally, the at least one secondary liquid crystal element is implemented as at least one liquid crystal lens.

The dispersion properties of the secondary active material being different from the dispersion properties of the primary active material means that a manner in which different wavelengths of the polychromatic light are refracted on passing through the secondary active material is different from a manner in which the different wavelengths of the polychromatic light are refracted on passing through the primary active material. Dispersion properties of the given active material are indicative of an extent of such refraction. It is important that the dispersion properties of the secondary active material and the primary active material be different, since that enables the secondary active material to provide a compensatory refractive effect which corrects chromatic aberration in the polychromatic light for the first design wavelength and the second design wavelength.

Optionally, the dispersion properties comprise at least one of: wavelength-dependent birefringence, a refractive index of an ordinary ray ($n_o$), a refractive index of an extraordinary ray ($n_e$), Abbe number, Sellmeier coefficients, Cauchy's transmission coefficients. The wavelength-dependent birefringence means that a birefringence of the given active material changes according to a wavelength of light. The birefringence of the given active material for a given wavelength depends on a difference between an extraordinary refractive index and an ordinary refractive index of the given active material for the given wavelength.

The extraordinary refractive index is the refractive index of the extraordinary ray ($n_e$). The ordinary refractive index is the refractive index of the ordinary ray ($n_o$). A high birefringence of the given active material for the given wavelength means that a light having the given wavelength would experience high splitting or separation between their ordinary and extraordinary polarization states (which are two orthogonal polarization states), and vice versa. Furthermore, the high birefringence of the given active material for the given wavelength also means that an effect of changing an alignment of liquid crystal molecules of the given active material is quite strong on the light of the given wavelength, resulting in a substantial change in how such light is manipulated as it passes through the given active material.

In the above regard, the Abbe number quantifies how much the given active material's refractive index varies with different wavelengths of light. A higher Abbe number indicates low dispersion, while a lower Abbe number indicates high dispersion. The higher Abbe number means that the refractive index of the given active material changes less with different wavelengths of light, and that when the polychromatic light passes through the given active material, less chromatic aberration will be produced.

Furthermore, in the above regard, the Sellmeier coefficients are coefficients of the Sellmeier equation (which relates a refractive index of a given active material to the wavelength of light). The Sellmeier coefficients determine a strength and a position of dispersion features, for example, such as a location and a magnitude of refractive index change across different wavelengths. Likewise, the Cauchy's transmission coefficients are coefficients of the Cauchy's transmission equation.

It will be appreciated that other factors, such as material composition and molecular structure of the given active material also play significant roles in affecting the overall dispersion properties of the given active material.

It will be appreciated that the processor is communicably coupled to the primary liquid crystal element and the at least one secondary liquid crystal element. The at least one processor could be implemented as at least one of: a microprocessor, a microcontroller, or a controller. As an example, the at least one processor could be implemented as an application-specific integrated circuit (ASIC) chip or a reduced instruction set computer (RISC) chip.

When the primary drive signal drives the primary liquid crystal element, there is produced the first primary optical power for the first design wavelength, along with the second primary optical power for the second design wavelength. The second primary optical power is produced due to the dispersion properties of the primary active material. This means that the primary liquid crystal element focuses different wavelengths of light at different focal points. Notably, a difference between the first primary optical power and the second primary optical power produces chromatic aberration (that is to be compensated).

Optionally, when the optical apparatus is to be used for ophthalmic purposes, a given primary optical power may lie in a range of +/−0.25 dioptre (D) to +/−4 D. The given primary optical power (i.e., the first primary optical power and/or the second primary optical power) may be from +/−0.25 D, +/−1 D, +/−1.5 D, or +/−2 D up to +/−2.5 D, +/−3 D, or +/−4 D. As an example, the first primary optical power may be +/−2.5 D. It will be appreciated that in many cases, this power can be achieved only by stacking multiple liquid crystal elements with lower optical powers. Thus, it is feasible that the primary liquid crystal element may comprise a plurality of liquid crystal sub-elements having lower optical powers than the aforesaid range.

As a first example, the polychromatic light may comprise the visible light (i.e., light in that part of the electromagnetic spectrum which human eyes can view). The primary drive signal may drive the primary liquid crystal element to produce the first primary optical power for blue light (for example, a light having a wavelength of approximately 480 nanometre (nm)). There may also be produced the second primary optical power for red light (for example, a light having a wavelength of approximately 630 nm), the second primary optical power being less than the first primary optical power. As a result, chromatic aberration occurs such that the red light will be focused at a focal point that is farther from the primary liquid crystal element than a focal point of the blue light.

To compensate for the chromatic aberration produced by the primary liquid crystal element, the at least one secondary liquid crystal element is driven using the secondary drive signal. As mentioned earlier, the first secondary optical power and the second secondary optical power are selected (and the secondary drive signal is generated) based on the first primary optical power, the second primary optical power, and the dispersion properties of the primary active material and the secondary active material. Details of how the first secondary optical power and the second secondary optical power can be selected have been provided in detail later. It will be appreciated that a given secondary optical power for one design wavelength would be different from another secondary optical power for another design wavelength, since the secondary active material needs to produce different compensatory dispersion on different design wavelengths, in order to compensate for the chromatic aberration.

Referring to the first example, the secondary drive signal may drive the at least one secondary liquid crystal element to produce the first secondary optical power for the blue light and the second secondary optical power for the red light, the second secondary optical power being different from the first secondary optical power. As a result, chromatic aberration is compensated such that the red light will be focused at the same focal point (or at a focal point that is close to) as a focal point of the blue light. In this regard, the secondary active material may have a higher birefringence for the blue light and a relatively lower birefringence for the red light.

When the at least one secondary liquid crystal element comprises the plurality of secondary liquid crystal elements, the first secondary optical power is a combined optical power that is a sum of first secondary optical powers produced by respective ones of the plurality of secondary liquid crystal elements, and the second secondary optical power is also a combined optical power that is a sum of second secondary optical powers produced by the respective ones of the plurality of secondary liquid crystal elements.

The first secondary optical power and the second secondary optical power are produced to counterbalance dispersive effects of the first primary optical power and the second primary optical power, respectively, on the polychromatic light. The first secondary optical power and the second secondary optical power manipulate light having the first design wavelength and light having the second design wavelength differently, as compared to the first primary optical power and the second primary optical power, respectively, such that these lights are focused exactly or nearly to a same focus point after exiting the at least one secondary liquid crystal element.

It will be appreciated that the at least one secondary liquid crystal element could comprise a plurality of secondary liquid crystal elements to compensate for the chromatic aberration produced on the polychromatic light. In this regard, the chromatic aberration produced due to dispersion of the respective second design wavelengths with respect to the first design wavelength could be compensated using different secondary active materials having dispersion properties that are different from the dispersion properties of the primary active material. In other words, these different secondary active materials could be employed in different ones of the plurality of secondary liquid crystal elements.

Optionally, a difference between a first sum of the first primary optical power and the first secondary optical power and a second sum of the second primary optical power and the second secondary optical power is less than a predefined threshold. This means that a first collective dispersion effect produced by the primary liquid crystal element and the at least one secondary liquid crystal element on the first design wavelength is same as or nearly same as a second collective dispersion effect produced by the primary liquid crystal element and the at least one secondary liquid crystal element on the second design wavelength. This is so because the difference between the first sum (which is a combined optical power for the first design wavelength) and the second sum (which is a combined optical power for the second design wavelength) is less than the predefined threshold. This emulates the chromatic aberration correction effect provided by achromatic doublet lenses or similar, in the optical apparatus. It will be appreciated that a given sum is calculated by taking into account both a magnitude and a sign of optical power.

Optionally, the predefined threshold lies in a range of 0.05 dioptre (D) to 1 dioptre. For example, the predefined threshold may be from 0.05, 0.1, 0.2, or 0.5 D up to 0.4, 0.6, 0.8, or 1 D. In an example, the predefined threshold may be 0.5 D, in case of very high optical powers of the primary liquid crystal element. In another example, the predefined threshold may be 0.1 D in ophthalmic applications.

In an embodiment, if a variation in birefringence of the secondary active material from the first design wavelength to the second design wavelength is in a opposite direction as compared to a variation in birefringence of the primary active material from the first design wavelength to the second design wavelength, a sign of the first secondary optical power and the second secondary optical power is same as a sign of the first primary optical power and the second primary optical power. Said variations being in the "opposite direction" means that on going from the first design wavelength to the second design wavelength: the birefringence of the secondary active material increases whereas the birefringence of the primary active material decreases; or the birefringence of the secondary active material decreases whereas the birefringence of the primary active material increases. When the dispersion properties of the secondary active material and the primary active material have opposite trends (for example, when signs of slopes for the wavelength-dependent birefringence are different), chromatic aberration compensation can be achieved by utilizing optical powers of the same signs in the primary and secondary liquid crystal elements.

As an illustrative example, the first design wavelength may be 550 nanometres (nm), corresponding to green colour, and the second design wavelength may be 730 nm corresponding to red colour. Now let us consider that the birefringence of the primary active material for the first design wavelength is less than the birefringence of the primary active material for the second design wavelength. When the primary liquid crystal element is driven (using the primary drive signal) to produce the first primary optical power of 2 D for the first design wavelength, there may be produced the second primary optical power of 1.9 D for the second wavelength. Now when the birefringence of the secondary active material for the first design wavelength is higher than the birefringence of the secondary active material for the second design wavelength, the at least one secondary liquid crystal element may be driven (using the secondary drive signal) such that the first secondary optical power is 0.1 D for the first design wavelength and the second secondary optical power is 0.2 D for the second design wavelength. In such an example, the first sum and the second sum are equal to 2.1 D.

Optionally, in such a case, a magnitude of the variation in the birefringence of the secondary active material from the first design wavelength to the second design wavelength lies in a range of 0 times to 1 time of a magnitude of the variation in the birefringence of the primary active material from the first design wavelength to the second design wavelength. For example, the magnitude of the variation in the birefringence of the secondary active material from the first design wavelength to the second design wavelength may lie from 0 times, 0.1 times, 0.2 times, or 0.5 times up to 0.6 times, 0.7 times, 0.8 times, 0.9 times, or 1 time of the magnitude of the variation in the birefringence of the primary active material from the first design wavelength to the second design wavelength. This range of the magnitudes of such variations means that upon adding of the first secondary optical power and the second secondary optical power to the first primary optical power and the second primary optical power having the same sign, respectively, combined optical powers achieved for the first and second design wavelengths (i.e., the first combined optical power and the second combined optical power) are equal or nearly equal, and thus effective chromatic aberration compensation is provided.

In an embodiment, if a variation in birefringence of the secondary active material from the first design wavelength to the second design wavelength is in a same direction as compared to a variation in birefringence of the primary active material from the first design wavelength to the second design wavelength, a sign of the first secondary optical power and the second secondary optical power is different from a sign of the first primary optical power and the second primary optical power. Said variations being in the "same direction" means that on going from the first design wavelength to the second design wavelength: the birefringence of the secondary active material increases and the birefringence of the primary active material increases; or the birefringence of the secondary active material decreases and the birefringence of the primary active material decreases. When the dispersion properties of the secondary active material and the primary active material have same trends (for example, when signs of slopes for the wavelength-dependent birefringence are same), chromatic aberration compensation can be achieved by utilizing optical powers of the opposite signs in the primary and secondary liquid crystal elements. In this regard, magnitudes of such dispersion properties may be different. For example, a magnitude of a birefringence of the secondary active material may be different from a magnitude of a birefringence of the primary active material, for a given wavelength.

As another illustrative example, the first design wavelength may be 550 nanometre (nm), and the second design wavelength may be 730 nm. Now let us consider that the birefringence of the primary active material for the first design wavelength is less than the birefringence of the primary active material for the second design wavelength. When the primary liquid crystal element is driven (using the primary drive signal) to produce the first primary optical power of 2 D for the first design wavelength, there may be produced the second primary optical power of 1.9 D for the second design wavelength. Now when the birefringence of the secondary active material for the first design wavelength is also less than the birefringence of the secondary active material for the second design wavelength, the at least one secondary liquid crystal element may be driven (using the secondary drive signal) such that the first secondary optical power is −0.2 D for the first design wavelength and the second secondary optical power is −0.1 D for the second design wavelength. In such an example, the first sum and the second sum are equal to 1.8 D.

Optionally, in such a case, a magnitude of the variation in the birefringence of the secondary active material from the first design wavelength to the second design wavelength lies in a range of 2 times to 5 times of a magnitude of the variation in the birefringence of the primary active material from the first design wavelength to the second design wavelength. Optionally, greater the magnitude of the variation in the birefringence of the secondary active material from the first design wavelength to the second design wavelength, lesser is at least one of: a magnitude of the first secondary optical power, a magnitude of the second secondary optical power. For example, the magnitude of the variation in the birefringence of the secondary active material from the first design wavelength to the second design wavelength may lie from 2 times, 2.5 times, 3 times, 3.5 times, or 4 times up to 2.75 times, 3.75 times, 4 times, 4.5 times, or 5 times of the magnitude of the variation in the birefringence of the primary active material from the first design wavelength to the second design wavelength. This means that the secondary active material has a much stronger dispersion as compared to the primary active material. This is advantageous since less magnitudes of first and second secondary powers need to be produced by the at least one secondary liquid crystal element to achieve effective chromatic aberration compensation for the first design wavelength and the second design wavelength.

Moreover, optionally, the optical apparatus further comprises a temperature sensor that is to be employed to sense a temperature of the primary liquid crystal element,
wherein the at least one processor is configured to generate the secondary drive signal for the at least one secondary liquid crystal element based further on the temperature of the primary liquid crystal element.

In this regard, the secondary drive signal is generated to compensate for temperature-induced effects on the dispersion properties of the primary active material. It is well-known that in liquid crystal elements, temperature strongly affects dispersion of active materials. A change in the temperature of such liquid crystal elements affects a chemical composition and/or orientation of liquid crystal molecules of the active materials of such liquid crystal elements. Therefore, employing the temperature sensor in the optical apparatus and generating the secondary drive signal based on the temperature of the primary liquid crystal element improves the chromatic aberration compensation provided by the at least one secondary liquid crystal element. In this regard, values of birefringence are in units of $\Delta n$, which is equal to $n_e - n_o$, where $n_e$ and $n_o$ are the extraordinary refractive index and the ordinary refractive index that correspond to light polarized along and perpendicular to a local nematic liquid crystal director (n), whose variation determines the variation of birefringence with temperature. It will be appreciated that the "local nematic liquid crystal director" could be different for different nematic materials. As an example, for rod-like (calamitic) nematic materials, the local nematic liquid crystal director is an orientation of a long axis of molecules within a nematic liquid crystal phase. As another example, for disk-like (discotic) nematic materials, the local nematic liquid crystal director is directed along a plane of disks of a nematic liquid crystal.

The temperature sensor may be a thermocouple, a resistance temperature detector (RTD), a thermistor, an integrated temperature sensor, or similar. The temperature sensor may be arranged in proximity of the primary liquid crystal element, may be embedded into lens assembly of the primary liquid crystal element, or similar. It will be appreciated that changing a given drive voltage (in a given drive signal) changes a lens profile of a given liquid crystal element to which such given drive voltage is applied. This allows the at least one secondary liquid crystal element to compensate for the aforesaid temperature-induced effects on the dispersion properties of the primary active material.

Optionally, a magnitude of a variation in birefringence of the secondary active material as a function of temperature is different from a magnitude of a variation in birefringence of the primary active material as a function of temperature. In other words, the variation in the birefringence of the secondary active material with respect to temperature is different from the variation in the birefringence of the primary active material with respect to temperature. Beneficially, this enables the at least one secondary liquid crystal element (including the secondary active material) to provide effective chromatic aberration compensation for the temperature-induced effects on the dispersion of the primary active material. Typically, birefringence of a given active material decreases as its temperature approaches a clearing point of the given active material. The clearing point of the given active material is that temperature at which the given active material is $n_o$ longer a liquid crystal but instead is an isotropic liquid.

Optionally, a clearing point of the secondary active material differs from a clearing point of the primary active material by at least 50 Kelvin. As an example, the clearing point of the secondary active material differs from the clearing point of the primary active material by 100 Kelvin. This advantageously ensures that the secondary active material, which is used to compensate for the temperature-induced effects on the dispersion properties of the primary active material, has thermal properties that are different from thermal properties of the primary active material. Optionally, the optical apparatus is designed such that temperature effects on birefringence are stronger in the secondary active material. This can be achieved by purposefully selecting as the secondary active material a liquid crystal material that operates closer to a given clearing point than a liquid crystal material selected as the primary active material.

Optionally, a magnitude of the first secondary optical power and the second secondary optical power is smaller than a predefined optical power. Optionally, in this regard, the at least one secondary liquid crystal element operates within a linear part of a birefringence curve of the at least one secondary liquid crystal element. This enables using the at least one secondary liquid crystal element for both negative and positive optical powers. The birefringence curve of the at least one secondary liquid crystal element is a graphical plot of birefringence of the secondary active material versus drive voltage (for example, in Volts) provided to the at least one second liquid crystal element. For example, when a nematic liquid crystal is employed as the secondary active material, the linear part of the birefringence curve of the at least one secondary liquid crystal element may occur between 3 Volts to 8 Volts applied over the at least one secondary liquid crystal element.

Optionally, the predefined optical power lies in a range of +/−0.5 D to +/−1 D. More optionally, the predefined optical power lies in a range of +/−0.65 D to +/−0.85 D. As an example, the predefined optical power may be +/−0.75 D. Correspondingly, feasible ranges for the first secondary optical power and the second secondary optical power are determined. It will be appreciated that such feasible ranges where only the linear part of the birefringence curve is utilised depends not only on the predefined optical power, but also on one or more other factors such as a lens design (for example, such as a number and a size of Fresnel resets), a lens size, the secondary active material, thickness of a layer of the secondary active material, and the like.

Optionally, a cell gap of the at least one secondary liquid crystal element is smaller than a cell gap of the primary liquid crystal element. Due to the cell gap of the at least one secondary liquid crystal element being small, a large range of secondary active materials (such as a single-frequency mesogen) can be employed as the secondary active material without compromising on switching speed of the at least one secondary liquid crystal element. Optionally, the cell gap of the primary liquid crystal element lies in a range of 10 micrometre to 50 micrometre. It will be appreciated that the cell gap of the at least one secondary liquid crystal element is determined based on properties of the secondary active material. For example, when a single-frequency liquid crystal is used as the secondary active material, the cell gap of the at least one secondary liquid crystal element needs to be small enough for fast relaxation. Here, "relaxation" refers to a transition of liquid crystals in the secondary active material, from their excited state to their ground state. Enabling fast relaxation by suitably selecting the cell gap of the at least one secondary liquid crystal element is beneficial, since in single-frequency mesogens, relaxation cannot be actively sped up by an external voltage.

Optionally, the secondary active material comprises at least one of: a single-frequency mesogen, a dual-frequency mesogen. Likewise, the primary active material comprises at least one of: a single-frequency mesogen, a dual-frequency mesogen. A technical effect of using the dual-frequency mesogen in active materials is that it enables driven relaxation (switching off) of liquid crystal elements comprising such active materials, due to its frequency-dependent response. It will be appreciated that a given active material is made up of at least one liquid crystal compound that exhibits nematic liquid crystal structure in an intended operating temperature range of the optical apparatus. In some implementations, the given active material comprises a single liquid crystal compound, whereas in other implementations, the given active material comprises a plurality of liquid crystal compounds. Furthermore, optionally, the given active material comprises at least one of: a cyanobiphenyl, a phenylcyclohexane, a fluorinated compound, a chiral dopant.

The present disclosure also relates to the imaging system of the second aspect as described above. Various embodiments and variants disclosed above, with respect to the aforementioned first aspect, apply mutatis mutandis to the imaging system. The term "imaging system" refers to an apparatus that is usable for imaging objects or their portions. The imaging system may be used for imaging objects or their portions for a variety of applications including inspection of the objects or their portions, machine vision, gaming, art, and so forth. Examples of the imaging system include, but are not limited to, a camera, a microscope, a medical imaging device, a distance viewing device (such as binoculars, telescope, and similar), and so forth. The imaging system can be a standalone equipment or be a part of a larger equipment such as a pair of augmented-reality (AR) glasses, an AR headset, a pair of mixed-reality (MR) glasses, an MR headset, and the like.

The "image sensor" is a device which receives the polychromatic light at its photo-sensitive surface, when the polychromatic light is incident thereupon. The image sensor comprises a plurality of photo-sensitive elements, which collectively form the photo-sensitive surface of the image sensor. The image sensor is arranged on the optical path in a proximity of a surface of the at least one secondary liquid crystal element from which the polychromatic light exits the at least one secondary liquid crystal element. A distance between the image sensor and the at least one secondary liquid crystal element is chosen so that the image plane of the optical system (which consists of the first liquid crystal optical element, secondary LC optical element(s) and other optical elements such as lenses and prisms) is at the photo-sensitive surface of the imaging sensor. Upon effective compensation of the chromatic aberration, light having the first and second design wavelengths is sharply imaged at the image plane of the optical system, thereby forming a sharp multi-colour image at the image sensor.

The present disclosure also relates to the method of the third aspect as described above. Various embodiments and variants disclosed above, with respect to the aforementioned first aspect and the second aspect, apply mutatis mutandis to the method.

Optionally, in the method, if a variation in birefringence of the secondary active material from the first design wavelength to the second design wavelength is in a opposite direction as compared to a variation in birefringence of the primary active material from the first design wavelength to the second design wavelength, a sign of the first secondary optical power and the second secondary optical power is same as a sign of the first primary optical power and the second primary optical power.

Optionally, in the method, if a variation in birefringence of the secondary active material from the first design wavelength to the second design wavelength is in a same direction as compared to a variation in birefringence of the primary active material from the first design wavelength to the second design wavelength, a sign of the first secondary optical power and the second secondary optical power is different from a sign of the first primary optical power and the second primary optical power.

Optionally, the method further comprises employing a temperature sensor to sense a temperature of the primary liquid crystal element, wherein the step of generating the secondary drive signal for the at least one secondary liquid crystal element is performed based further on the temperature of the primary liquid crystal element.

DETAILED DESCRIPTION OF THE DRAWINGS

Figure 2:
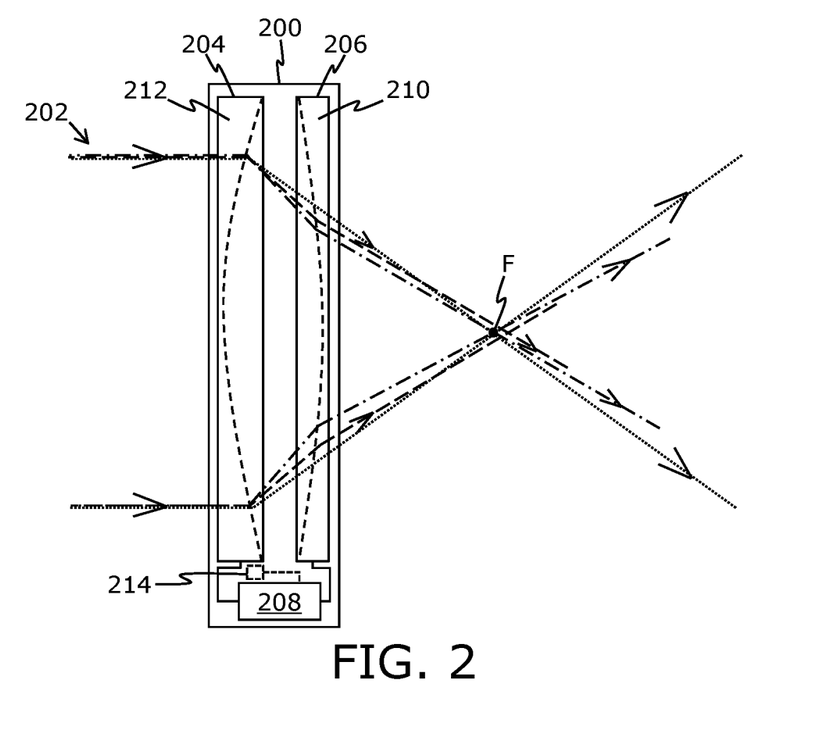
FIG. 2 is a ray diagram illustrating an optical apparatus incorporating compensation of chromatic aberration in liquid crystal elements and how the optical apparatus affects polychromatic light passing therethrough, in accordance with an embodiment of the present disclosure.

Referring to FIG. 2, a ray diagram illustrates an optical apparatus 200 incorporating compensation of chromatic aberration in liquid crystal elements and how the optical apparatus 200 affects polychromatic light 202 passing therethrough, in accordance with an embodiment of the present disclosure. The optical apparatus 200 comprises a primary liquid crystal element 204, at least one secondary liquid crystal element (depicted as a secondary liquid crystal element 206), and at least one processor (depicted as a processor 208). The secondary liquid crystal element 206 is arranged on an optical path of the polychromatic light 202 exiting the primary liquid crystal element 204. The secondary liquid crystal element 206 comprises a secondary active material 210 whose dispersion properties are different from dispersion properties of a primary active material 212 of the primary liquid crystal element 204.

The processor 208 is configured to: generate a primary drive signal to drive the primary liquid crystal element 204 to produce a first primary optical power for a first design wavelength, wherein the primary liquid crystal element 204, when driven, also produces at least a second primary optical power for a second design wavelength; and generate a secondary drive signal to drive the secondary liquid crystal element 206 to produce a first secondary optical power for the first design wavelength and at least a second secondary optical power for the second design wavelength, based on the first primary optical power, the second primary optical power, the dispersion properties of the secondary active material 210 and the dispersion properties of the primary active material 212. The first secondary optical power and the second secondary optical power, when produced at the secondary liquid crystal element 206, compensate for chromatic aberration produced by the primary liquid crystal element 204 on the polychromatic light 202 for the first design wavelength and the second design wavelength. For example, light having different wavelengths (depicted as rays of different styles) are focused to nearly a same focus point F. The optical apparatus 200 optionally further comprises a temperature sensor 214 that is to be employed to sense a temperature of the primary liquid crystal element 204, wherein the processor 208 is optionally configured to generate the secondary drive signal for the secondary liquid crystal element 206 based further on the temperature of the primary liquid crystal element 204.

It may be understood by a person skilled in the art that FIG. 2 is merely an example for sake of clarity, which should not unduly limit the scope of the claims herein. The person skilled in the art will recognize many variations, alternatives, and modifications of embodiments of the present disclosure. For example, the optical apparatus 200 may comprise a plurality of secondary liquid crystal elements.

Figure 3:
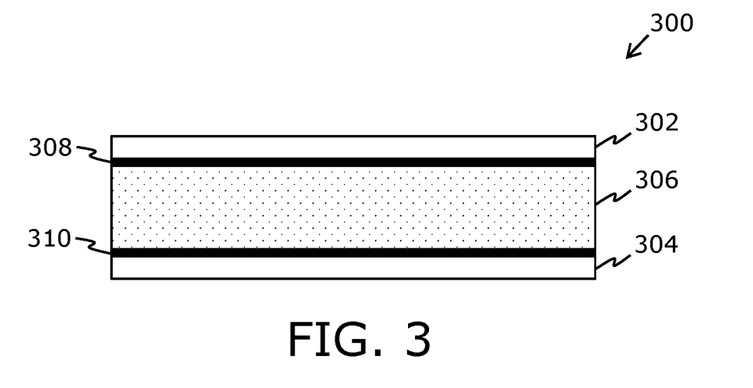
FIG. 3 illustrates a cross-section view of a given liquid crystal element, in accordance with an embodiment of the present disclosure.

Referring to FIG. 3, illustrated is a cross-section view of a given liquid crystal element 300, in accordance with an embodiment of the present disclosure. The given liquid crystal element 300 comprises: at least a first substrate 302 and a second substrate 304 that are optically transparent, wherein a given active material 306 is encased between the first substrate and the second substrate; at least one first electrode (depicted as a first electrode 308) deposited on the first substrate 302 and disposed between the first substrate 302 and the given active material 306; and at least one second electrode (depicted as a second electrode 310) deposited on the second substrate 304 and disposed between the second substrate 304 and the given active material 306, wherein the first electrode 308 and the second electrode 310 are optically transparent.

FIG. 3 is merely an example, which should not unduly limit the scope of the claims herein. A person skilled in the art will recognize many variations, alternatives, and modifications of embodiments of the present disclosure.

Figure 4:
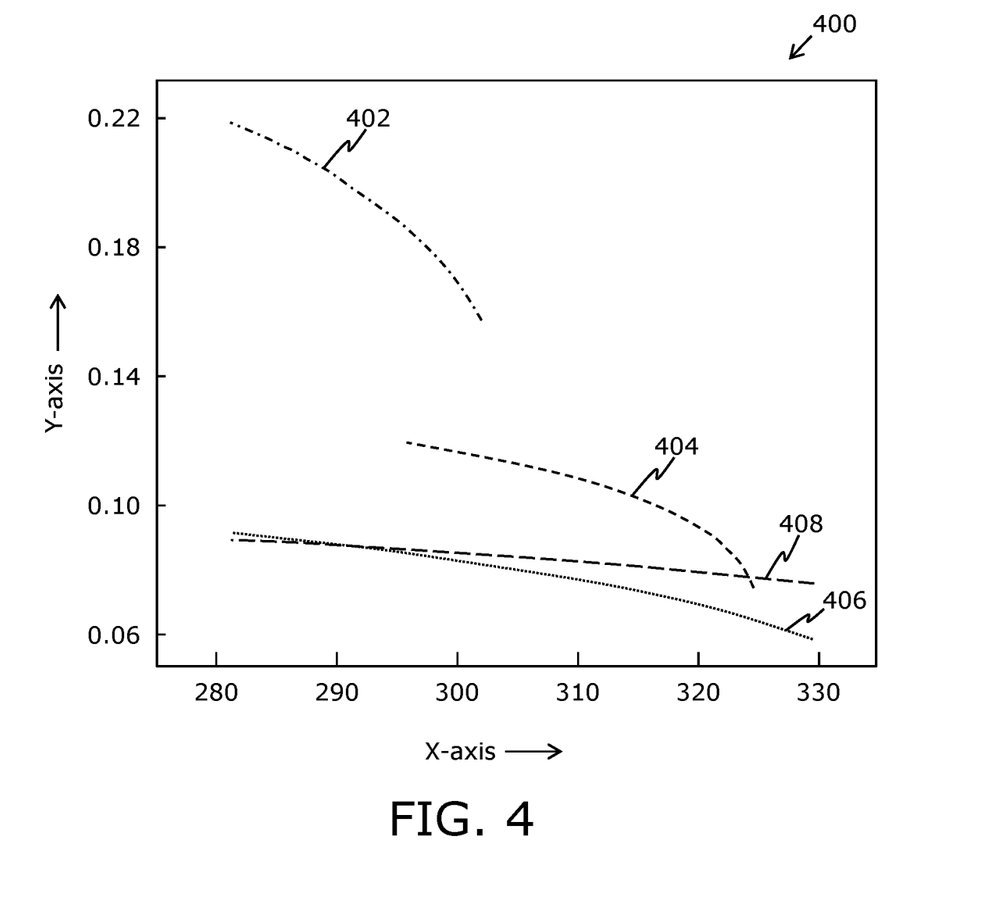
FIG. 4 is a graphical illustration of how birefringence of various active materials varies as a function of temperature, in accordance with an embodiment of the present disclosure.

Referring to FIG. 4, illustrated is a graphical illustration 400 of how birefringence of various active materials varies as a function of temperature, in accordance with an embodiment of the present disclosure. In the graphical illustration 400, values of temperature (in Kelvin) are represented along the X-axis, and values of birefringence are represented along the Y-axis. The values of birefringence are in units of $\Delta n$, which is equal to $n_e - n_o$, where $n_e$ and $n_o$ are the extraordinary refractive index and the ordinary refractive index that correspond to light polarized along and perpendicular to a local nematic liquid crystal director n, whose variation determines the variation of birefringence with temperature.

In an example, a variation in birefringence of 4-Cyano-4'-pentylbiphenyl active material as a function of temperature is depicted by a curve 402. The curve 402 represents a high (i.e., drastic) reduction in birefringence with an increase in temperature. In another example, a variation in birefringence of 4-(trans-4-Pentylcyclohexyl) benzonitrile (PCH5) active material as a function of temperature is depicted by a curve 404. The curve 404 represents a moderate (i.e., gradual) reduction in birefringence with an increase in temperature. In yet another example, a variation in birefringence of UCF-280 active material as a function of temperature is depicted by a curve 406. The curve 406 represents a low (i.e., very gradual) reduction in birefringence with an increase in temperature. In still another example, a variation in birefringence of MLC-6241-000 active material as a function of temperature is depicted by a curve 408. The curve 408 represents a very low (i.e., extremely gradual) reduction in birefringence with an increase in temperature.

FIG. 4 is merely an example, which should not unduly limit the scope of the claims herein. A person skilled in the art will recognize many variations, alternatives, and modifications of embodiments of the present disclosure.

Figure 5:
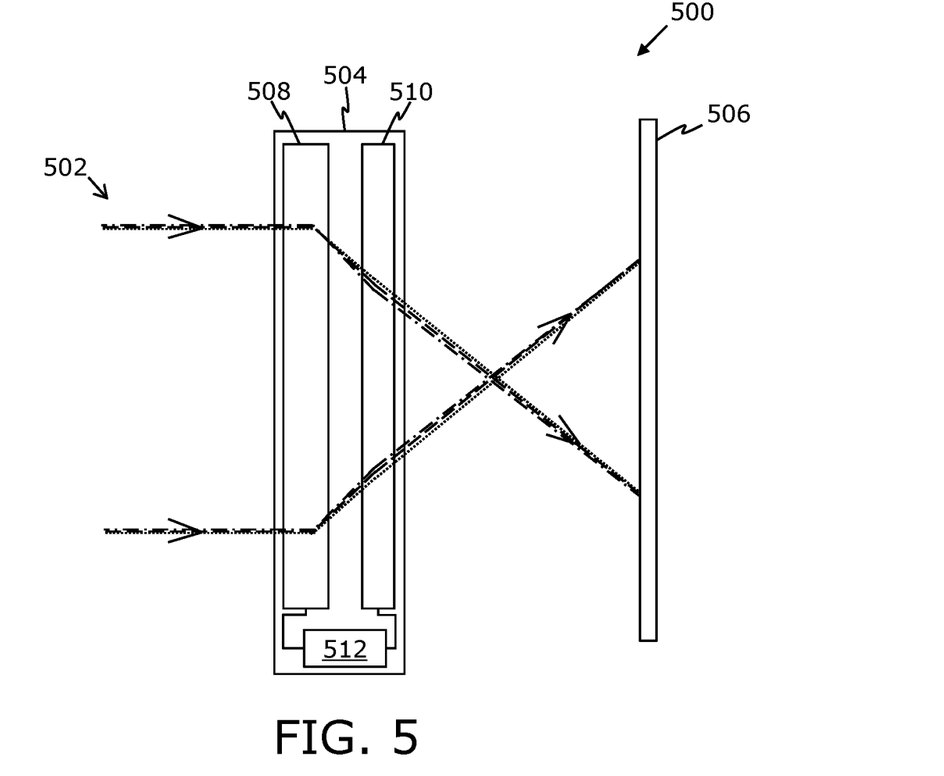
FIG. 5 is a schematic illustration of an imaging system comprising an optical apparatus incorporating compensation of chromatic aberration in liquid crystal elements and how polychromatic light passes through the imaging system, in accordance with an embodiment of the present disclosure.

Referring to FIG. 5, illustrated is a schematic illustration of an imaging system 500 incorporating compensation of chromatic aberration in liquid crystal elements and how polychromatic light 502 passes through the imaging system 500, in accordance with an embodiment of the present disclosure. The imaging system 500 comprises an optical apparatus 504, and an image sensor 506. The optical apparatus 504 comprises a primary liquid crystal element 508, at least one secondary liquid crystal element (depicted as a secondary liquid crystal element 510), and at least one processor (depicted as a processor 512). Upon compensating the chromatic aberration, the secondary liquid crystal element 510 creates a sharp image of the first design wavelength and the second design wavelength in the polychromatic light 502, at the image sensor 506.

FIG. 5 is merely an example, which should not unduly limit the scope of the claims herein. A person skilled in the art will recognize many variations, alternatives, and modifications of embodiments of the present disclosure.

Figure 6:
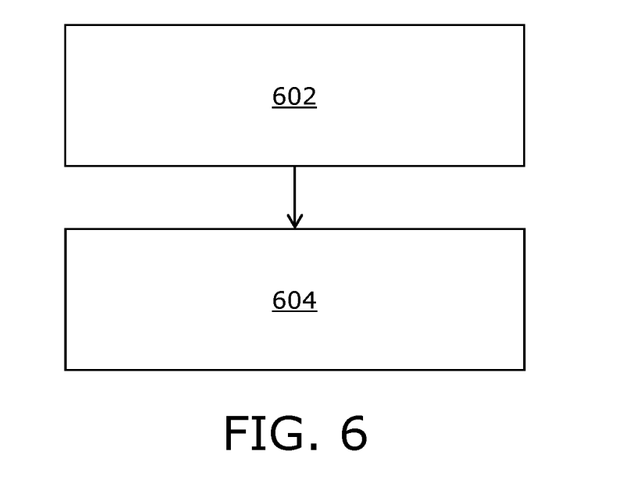
FIG. 6 illustrates steps of a method incorporating compensation of chromatic aberration in liquid crystal elements, in accordance with an embodiment of the present disclosure.

Referring to FIG. 6, illustrated are steps of a method incorporating compensation of chromatic aberration in liquid crystal elements, in accordance with an embodiment of the present disclosure. At step 602, there is generated a primary drive signal to drive a primary liquid crystal element to produce a first primary optical power for a first design wavelength. The primary liquid crystal element, when driven, also produces at least a second primary optical power for a second design wavelength. At step 604, there is generated a secondary drive signal to drive at least one secondary liquid crystal element to produce a first secondary optical power for the first design wavelength and at least a second secondary optical power for the second design wavelength, based on the first primary optical power, the second primary optical power, dispersion properties of a secondary active material of the at least one secondary liquid crystal element and dispersion properties of a primary active material of the primary liquid crystal element. The at least one secondary liquid crystal element is arranged on an optical path of polychromatic light exiting the primary liquid crystal element and the dispersion properties of the secondary active material are different from the dispersion properties of the primary active material. When produced at the at least one secondary liquid crystal element, the first secondary optical power and the second secondary optical power compensate for chromatic aberration produced by the primary liquid crystal element on the polychromatic light for the first design wavelength and the second design wavelength.

The aforementioned steps are only illustrative and other alternatives can also be provided where one or more steps are added, one or more steps are removed, or one or more steps are provided in a different sequence without departing from the scope of the claims herein.

The invention claimed is:

1. An optical apparatus comprising:
   a primary liquid crystal element;
   at least one secondary liquid crystal element arranged on an optical path of polychromatic light exiting the primary liquid crystal element, the at least one secondary liquid crystal element comprising a secondary active material whose dispersion properties are different from dispersion properties of a primary active material of the primary liquid crystal element; and
   at least one processor configured to:
      generate a primary drive signal to drive the primary liquid crystal element to produce a first primary optical power for a first design wavelength, wherein the primary liquid crystal element, when driven, also produces at least a second primary optical power for a second design wavelength; and
      generate a secondary drive signal to drive the at least one secondary liquid crystal element to produce a first secondary optical power for the first design wavelength and at least a second secondary optical power for the second design wavelength, based on the first primary optical power, the second primary optical power, the dispersion properties of the secondary active material and the dispersion properties of the primary active material;
   wherein when produced at the at least one secondary liquid crystal element, the first secondary optical power and the second secondary optical power compensate for chromatic aberration produced by the primary liquid crystal element on the polychromatic light for the first design wavelength and the second design wavelength.

2. The optical apparatus of claim 1, wherein a difference between a first sum of the first primary optical power and the first secondary optical power and a second sum of the second primary optical power and the second secondary optical power is less than a predefined threshold.

3. The optical apparatus of claim 1, wherein the dispersion properties comprise at least one of: wavelength-dependent birefringence, a refractive index of an ordinary ray ($n_o$), a refractive index of an extraordinary ray ($n_e$), Abbe number, Sellmeier coefficients, Cauchy's transmission coefficients.

4. The optical apparatus of claim 1, wherein if a variation in birefringence of the secondary active material from the first design wavelength to the second design wavelength is in a opposite direction as compared to a variation in birefringence of the primary active material from the first design wavelength to the second design wavelength, a sign of the first secondary optical power and the second secondary optical power is same as a sign of the first primary optical power and the second primary optical power.

5. The optical apparatus of claim 4, wherein a magnitude of the variation in the birefringence of the secondary active material from the first design wavelength to the second design wavelength lies in a range of 0 times to 1 time of a magnitude of the variation in the birefringence of the primary active material from the first design wavelength to the second design wavelength.

6. The optical apparatus of claim 1, wherein if a variation in birefringence of the secondary active material from the first design wavelength to the second design wavelength is in a same direction as compared to a variation in birefringence of the primary active material from the first design wavelength to the second design wavelength, a sign of the first secondary optical power and the second secondary optical power is different from a sign of the first primary optical power and the second primary optical power.

7. The optical apparatus of claim 6, wherein a magnitude of the variation in the birefringence of the secondary active material from the first design wavelength to the second design wavelength lies in a range of 2 times to 5 times of a magnitude of the variation in the birefringence of the primary active material from the first design wavelength to the second design wavelength.

8. The optical apparatus of claim 1, further comprising a temperature sensor that is to be employed to sense a temperature of the primary liquid crystal element,
   wherein the at least one processor is configured to generate the secondary drive signal for the at least one secondary liquid crystal element based further on the temperature of the primary liquid crystal element.

9. The optical apparatus of claim 8, wherein a magnitude of a variation in birefringence of the secondary active material as a function of temperature is different from a magnitude of a variation in birefringence of the primary active material as a function of temperature.

10. The optical apparatus of claim 8, wherein a clearing point of the secondary active material differs from a clearing point of the primary active material by at least 50 Kelvin.

11. The optical apparatus of claim 1, wherein a magnitude of the first secondary optical power and the second secondary optical power is smaller than a predefined optical power.

12. The optical apparatus of claim 1, wherein a cell gap of the at least one secondary liquid crystal element is smaller than a cell gap of the primary liquid crystal element.

13. The optical apparatus of claim 1, wherein the secondary active material comprises at least one of: a single-frequency mesogen, a dual-frequency mesogen.

14. An imaging system comprising an optical apparatus of claim 1, and an image sensor, wherein upon compensating the chromatic aberration, the at least one secondary liquid crystal element focuses light of the first design wavelength and the second design wavelength in the polychromatic light, at the image sensor.

15. A method comprising:
generating a primary drive signal to drive a primary liquid crystal element to produce a first primary optical power for a first design wavelength, wherein the primary liquid crystal element, when driven, also produces at least a second primary optical power for a second design wavelength; and
generating a secondary drive signal to drive at least one secondary liquid crystal element to produce a first secondary optical power for the first design wavelength and at least a second secondary optical power for the second design wavelength, based on the first primary optical power, the second primary optical power, dispersion properties of a secondary active material of the at least one secondary liquid crystal element and dispersion properties of a primary active material of the primary liquid crystal element, wherein the at least one secondary liquid crystal element is arranged on an optical path of polychromatic light exiting the primary liquid crystal element, and the dispersion properties of the secondary active material are different from the dispersion properties of the primary active material;
wherein when produced at the at least one secondary liquid crystal element, the first secondary optical power and the second secondary optical power compensate for chromatic aberration produced by the primary liquid crystal element on the polychromatic light for the first design wavelength and the second design wavelength.

16. The method of claim 15, wherein if a variation in birefringence of the secondary active material from the first design wavelength to the second design wavelength is in a opposite direction as compared to a variation in birefringence of the primary active material from the first design wavelength to the second design wavelength, a sign of the first secondary optical power and the second secondary optical power is same as a sign of the first primary optical power and the second primary optical power.

17. The method of claim 15, wherein if a variation in birefringence of the secondary active material from the first design wavelength to the second design wavelength is in a same direction as compared to a variation in birefringence of the primary active material from the first design wavelength to the second design wavelength, a sign of the first secondary optical power and the second secondary optical power is different from a sign of the first primary optical power and the second primary optical power.

18. The method claim 15, further comprising employing a temperature sensor to sense a temperature of the primary liquid crystal element, wherein the step of generating the secondary drive signal for the at least one secondary liquid crystal element is performed based further on the temperature of the primary liquid crystal element.

* * * * *